(No Model.)
W. H. THAYER.
HOG TROUGH.
No. 561,453. Patented June 2, 1896.
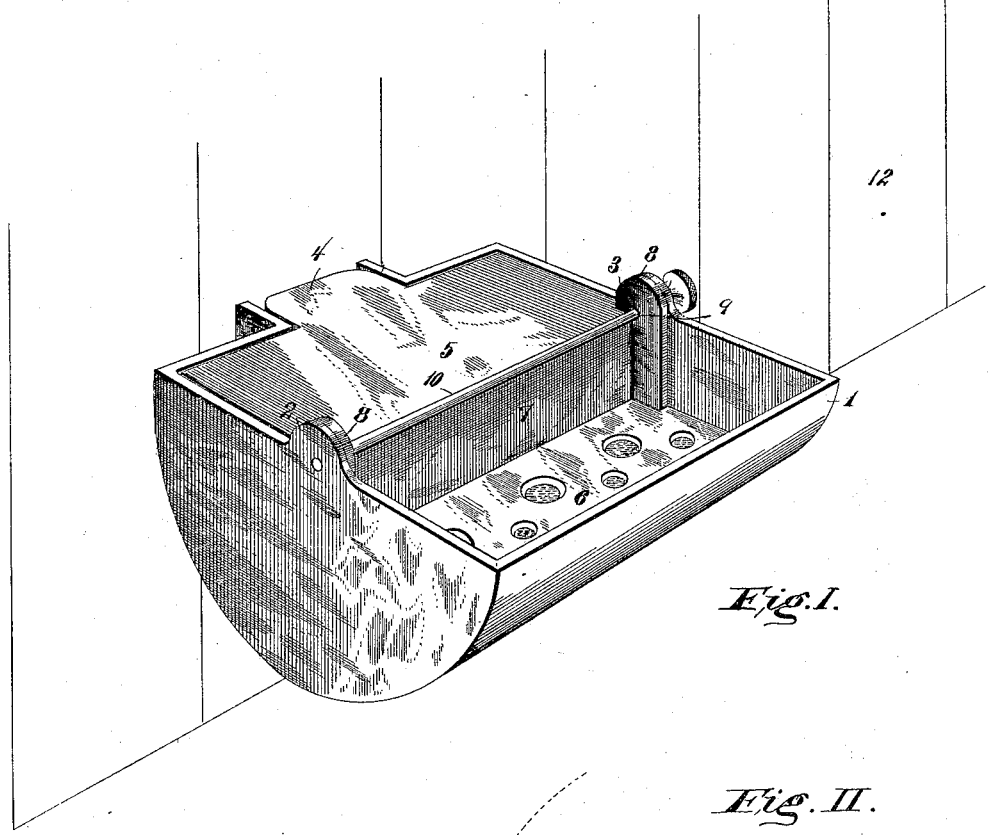
Fig. I.
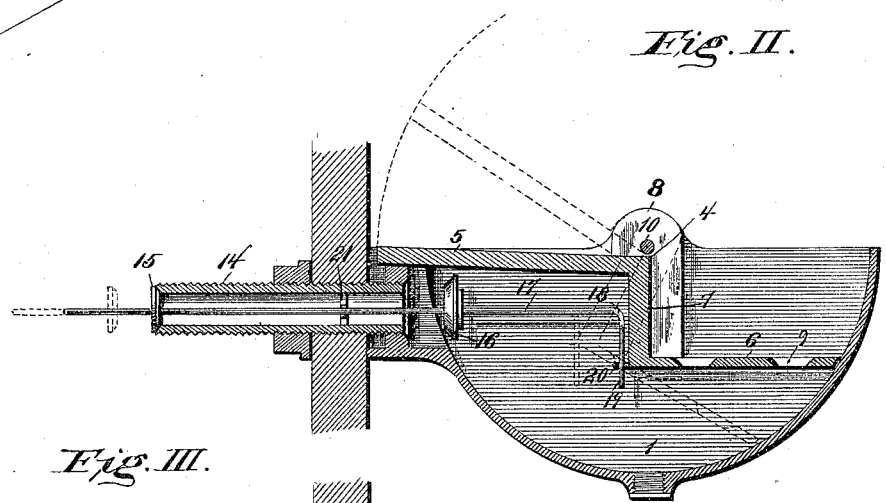
Fig. II.
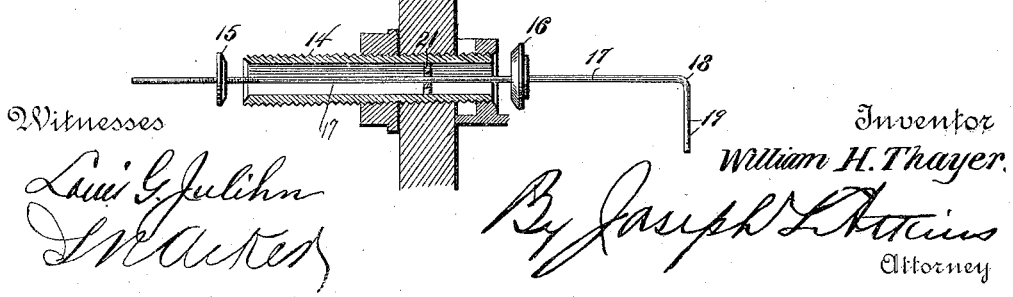
Fig. III.
Witnesses
Inventor
William H. Thayer.
By Joseph L. Atkins
Attorney

UNITED STATES PATENT OFFICE.

WILLIAM H. THAYER, OF ATCHISON, KANSAS.

HOG-TROUGH.

SPECIFICATION forming part of Letters Patent No. 561,453, dated June 2, 1896.

Application filed October 8, 1895. Serial No. 565,020. (No model.)

*To all whom it may concern:*

Be it known that I, WILLIAM H. THAYER, of Atchison, county of Atchison, State of Kansas, have invented certain new and useful Improvements in Hog-Troughs, of which the following is a specification, reference being had to the accompanying drawings.

The object of my invention is to produce a thoroughly-efficient automatic hog-trough that is simple and durable in construction and which can be manufactured at comparatively small cost.

In the accompanying drawings, Figure I is a perspective view of my trough complete. Fig. II is a section of the same, illustrating the supply-pipe and valve mechanism in detail. Fig. III is a detail view showing the valves in position for supplying liquid to the trough.

Referring to the figures on the drawings, 1 indicates the body of my trough, which is preferably semicylindrical, as illustrated, and provided with ears 2 and 3 on its end pieces. The body part is preferably made of cast-iron and is designed to accommodate a lid 4, which is preferably made of two platforms 5 and 6, united by a vertical wall 7. Lugs 8, having apertures 9, are arranged on the opposite ends thereof to accommodate a rod 10, located at a higher elevation than the trough.

14 indicates a supply-pipe, which at one end enters the barrel at or near its bottom and at its other end is secured, as by screw-threads, to the body of the trough in proximity to and a little below the lid 4. The outflow from the supply-pipe is controlled by oppositely-opening valves 15 and 16, secured to a stem 17, which is designed to be actuated by the swinging of the lid 4. This may be accomplished in a simple manner and by mechanism not liable to become out of order by making an elbow 18 in the stem 17 and providing a projecting end 19, which, engaging with a loop or staple 20 on the outside of the platform 5, renders the movement of the stem 17 dependent upon the movement of the lid. The stem 17 may be provided with a tripod guide 21 within the pipe 14 or with any other usual and ordinary means for properly setting the valves 15 and 16. The stem is adjustable with respect to the lid in such a manner that the weight of the lid tends to keep the valve 15 normally closed, thus preventing outflow from the tank 12, except when a supply of water is needed for the trough 1.

There is at all times some water in the trough 1, which the hog may see through the apertures 9, whereupon, pressing upon the platform 6, the lid is turned upon its pivot-rod 10 and a supply of water is admitted through the pipe 14. If the hog should force the lid down hard—as, for instance, getting his foot into the trough or otherwise—the lid forces the valve-stem 17 inwardly until the valve 16 is closed and shuts off the water supply.

By the employment of two valves the operation of the trough is rendered entirely automatic without danger of waste of the supply of water, while the valve 15, being normally closed, prevents the accumulation of water in the pipe 14 from being frozen. The valve 15 may be adjustable upon the stem 17, so as to regulate the supply.

What I claim is—

1. The combination with a trough, of a pivoted lid extending entirely across the same, and consisting of a vertical wall and two platforms in different planes, a supply-pipe communicating with the trough below the lid, valve-stem coaxial with the supply-pipe and operatively connected with the lid, and valves upon the valve-stem designed to be actuated successively by the continued movement of the lid in the same direction to permit and prevent, respectively the influx of water to the trough, substantially as specified.

2. The combination with a semicylindrical trough, of a lid pivoted concentrically with respect to the contour of the trough and consisting of a vertical wall and two platforms in different planes and of different weights the lower of said platforms being perforated and extending to the curved wall of the trough, the vertical wall and lower platform of the lid constituting in connection with the walls of the trough the drinking-receptacle proper, valves controlling the influx of water to the trough and designed to be actuated by the pivoted lid, substantially as specified.

3. The combination with a semicylindrical trough, of a counterweighted pivoted lid consisting of a vertical wall and two platforms in different planes, the axis of the lid being located at the top of the vertical wall and concentric with the curved contour of the trough, substantially as specified.

4. The combination with a semicylindrical trough, of a counterweighted pivoted lid consisting of a vertical wall and two platforms in different planes, the axis of the lid being located at the top of the vertical wall and concentric with the curved contour of the trough, a discharge-pipe communicating with the interior of the trough, a reciprocatory valve-stem coaxial with the supply-pipe, valves carried by the valve-stem adjacent to each end of the pipe, means for adjusting the relation of the valves, and mechanism for operatively connecting the valve-stem to the lid in proximity to the lower platform, substantially as specified.

In testimony of all which I have hereunto subscribed my name.

WILLIAM H. THAYER.

Witnesses:
IRA L. OWENS,
IRA B. OWENS.